US007532302B2

(12) United States Patent
Li

(10) Patent No.: US 7,532,302 B2
(45) Date of Patent: May 12, 2009

(54) METHOD OF REPAIRING GATE LINE ON TFT ARRAY SUBSTRATE

(75) Inventor: Qing-Hua Li, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 369 days.

(21) Appl. No.: 11/590,702

(22) Filed: Oct. 30, 2006

(65) Prior Publication Data

US 2007/0096768 A1 May 3, 2007

(30) Foreign Application Priority Data

Oct. 28, 2005 (TW) .............................. 94137843 A

(51) Int. Cl.
*G02F 1/13* (2006.01)

(52) U.S. Cl. ............................ 349/192; 349/54; 349/55

(58) Field of Classification Search ................. 349/192, 349/54, 55

See application file for complete search history.

(56) References Cited

U.S. PATENT DOCUMENTS 4,840,459 A 6/1989 Strong
6,646,694 B2 11/2003 Lee
7,349,035 B2 * 3/2008 Lai ............................. 349/38
7,417,692 B2 * 8/2008 Lin ............................. 349/38
2008/0170167 A1 * 7/2008 Su ............................. 349/38

FOREIGN PATENT DOCUMENTS

TW 242094 10/2005

* cited by examiner

*Primary Examiner*—David Nelms
*Assistant Examiner*—David Y Chung
(74) *Attorney, Agent, or Firm*—Wei Te Chung

(57) ABSTRACT

An exemplary method of repairing gate lines (201) of TFT array substrate, wherein the TFT array substrate includes a plurality of gate lines (201, 202), a plurality of data lines (211, 212, 213) crossing with the gate lines, a plurality of pixel electrode (221, 231), and a plurality of thin film transistors (240, 250), and one of the gate lines has a defect point (II). The method includes: cutting off an electrical connection between the gate electrode of one of the TFTs adjacent one side of the defect point and the corresponding data line, and cutting off an electrical connection between the gate electrode of one of the TFTs adjacent an opposite side of the defect point and the corresponding data line; electrically connecting the gate line having the defect point to each of two corresponding pixel electrodes that correspond to the two TFTs; and electrically connecting the two pixel electrodes.

12 Claims, 5 Drawing Sheets

METHOD OF REPAIRING GATE LINE ON TFT ARRAY SUBSTRATE

FIELD OF THE INVENTION

The present invention relates to a method of repairing broken lines or short lines on a thin film transistor (TFT) array substrate, and more particularly to a method of repairing a gate line on a TFT array substrate of a thin film transistor liquid crystal display (TFT-LCD) without the need for a repair line.

GENERAL BACKGROUND

A TFT-LCD has the advantages of portability, low power consumption, and low radiation, and has been widely used in various portable information products such as notebooks, personal digital assistants (PDAs), video cameras and the like. Furthermore, the TFT-LCD is considered by many to have the potential to completely replace CRT (cathode ray tube) monitors and televisions.

A TFT-LCD generally includes a color filter substrate, a TFT array substrate, and a liquid crystal layer sandwiched between the two substrates. When a TFT-LCD works, an electric field is applied to the liquid crystal molecules of the liquid crystal layer. At least some of the liquid crystal molecules change their orientations, whereby the liquid crystal layer provides anisotropic transmittance of light therethrough. Thus the amount of the light penetrating the color filter substrate is adjusted by controlling the strength of the electric field. In this way, desired pixel colors are obtained at the color filter substrate, and the arrayed combination of the pixel colors provides an image viewed on a display screen of the TFT-LCD.

Normally, the TFT array substrate includes a plurality of gate lines that are parallel to each other and extend along a first direction, and a plurality of data lines that are parallel to each other and extend along a second direction orthogonal to the first direction. The smallest rectangular area formed by any two adjacent gate lines together with any two adjacent data lines defines a pixel unit thereat. Each pixel unit includes a TFT which functions as a switching element, and a pixel electrode connected to the TFT.

As described above, the TFT array substrate has wiring patterns such as the gate lines and data lines, which supply signals to drive the pixel electrodes. However, the wiring patterns are liable to easily disconnect during heat treatment or etching processes when the TFT array substrate is being fabricated. That is, open or short circuits are liable to occur in the wiring patterns. The size and the resolution of certain contemporary TFT-LCD devices continue to increase with each new product release. Thus, a modern TFT array substrate may be required to have large numbers of data lines and gate lines each with a very narrow line width. The difficulties in fabricating such kind of TFT array substrate are also increased, with a greater possibility of broken wiring patterns. Accordingly, various repairing methods have been devised, whereby the corresponding TFT-LCD can operate correctly despite having sustained broken wiring.

FIG. 5 is a schematic, top plan view illustrating aspects of a typical method of repairing disconnected gate lines. An LCD (not shown) includes a TFT array substrate 10. The TFT array substrate 10 includes a display region 20. The display region 20 has a plurality of horizontally extended gate lines 16, and a plurality of vertically extended data lines 12, thereby forming an array of rectangular pixel regions (not labeled). The TFT array substrate 10 also includes a plurality of repair lines 22, 23, 24, which are formed to cross the data lines 12 and the gate lines 16 outside the display region 20.

When a broken point "A" occurs at the gate line 16, laser fusing or other known techniques can be used to connect points 26A and 26B, which are located where the broken gate line 16 meets the repair line 24. Then, the repair line 24 is cut off at positions 28A and 28B. Thus, the broken gate line 16 is connected through the repair line 24.

However, a capacitor exists between the repair line 24 and the repaired gate line 16. When signals transmit through the repair line 24, the signals are liable to be distorted at either or both of the crossing points 26A and 26B. In addition, if the number of gate lines 16 is very large, there may be numerous repaired gate lines 16 and numerous crossing points through which signals are passing. The relatively large number of capacitors means that the overall signal quality in the TFT array substrate 10 may be unsatisfactory. Furthermore, depending on the location of the broken data line 16, a large delay may occur due to the resistance and capacitance of the repair line 24 between opposite ends of the broken gate line 16. The increased delay may be unacceptable for large, high-resolution TFT-LCDs. Moreover, one single gate line 16 is generally repaired using one single repair line 24, and the number of repair lines 22, 23, 24 is limited due to the size of the display region 20.

What is needed, therefore, is a method of repairing broken gate lines without using repair lines, in order to overcome the above-described deficiencies.

SUMMARY

In one preferred embodiment, a method of repairing gate lines of a TFT array substrate of an LCD is provided. The TFT array substrate includes a plurality of gate lines, a plurality of data lines crossing the gate lines, a plurality of pixel electrode, and a plurality of thin film transistors. Each TFT includes a gate electrode, a source electrode, and a drain electrode connecting to a corresponding one of the gate lines, a corresponding one of the data lines, and a corresponding one of the pixel electrodes respectively. One of the gate lines has a defect point. The method includes: cutting off an electrical connection between the gate electrode of one of the TFTs adjacent one side of the defect point and the corresponding data line, and cutting off an electrical connection between the gate electrode of one of the TFTs adjacent an opposite side of the defect point and the corresponding data line; electrically connecting the gate line having the defect point to each of two pixel electrodes that correspond to the two TFTs at the two opposite sides of the defect point; and electrically connecting the two pixel electrodes.

Other advantages and novel features will become more apparent from the following detailed description when taken in conjunction with the accompanying drawings. In the drawings, all the views are schematic.

DETAILED DESCRIPTION OF PREFERRED EMBODIMENTS

Figure 1:
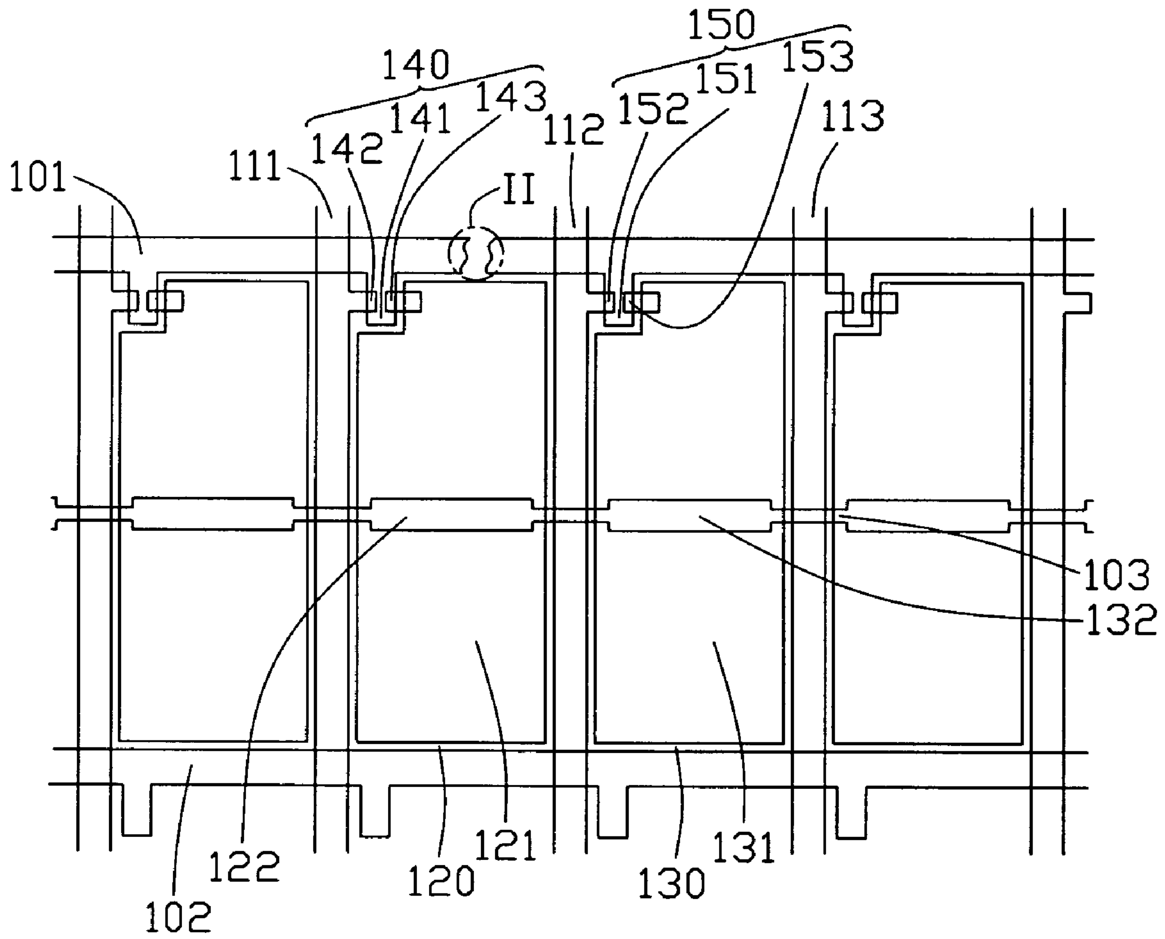
FIG. 1 is a top plan view of part of a thin film transistor substrate of a TFT-LCD having a disconnected gate line.

FIG. 1 is a schematic, top plan view of part of a TFT substrate of a TFT-LCD. The TFT substrate includes a plurality of gate lines 101, 102, and a plurality of data lines 111, 112, 113 crossing the gate lines 101, 102. Two rectangular areas formed by the gate lines 101, 102 and the data lines 111, 112, 113 define two pixel units 120, 130.

The pixel unit 120 includes a pixel electrode 121, a storage capacitor electrode 122 configured under the pixel electrode 121 and parallel to the gate line 101, and a TFT 140 that functions as a switching element. The TFT 140 is provided in the vicinity of a point of intersection of the gate line 101 and the data line 111. A gate electrode 141, a source electrode 142, and a drain electrode 143 of the TFT 140 are connected to the gate line 101, the data line 111, and the pixel electrode 121 respectively.

The pixel unit 130 includes a pixel electrode 131, a storage capacitor electrode 132 configured under the pixel electrode 131 and parallel to the gate line 101, and a TFT 150 that functions as a switching element. The TFT 150 is provided in the vicinity of a point of intersection of the gate line 101 and the data line 112. A gate electrode 151, a source electrode 152, and a drain electrode 153 of the TFT 150 are connected to the gate line 101, the data line 112, and the pixel electrode 131 respectively. The storage capacitor electrodes 122, 132 and other storage capacitor electrodes (not labeled) are arranged in a line and are connected in series to be parts of a conducting line 103.

The gate line 101 has a defect point "II" between the TFT 140 and the TFT 150. In the illustrated embodiment, the defect point "II" is a break in the gate line 101. When the TFT-LCD works, all TFTs connected to the gate line 101 at one side of the broken point "II" are not activated because of the broken point "II". Thus, a dark line is always displayed on a screen of the TFT-LCD.

Figure 2:
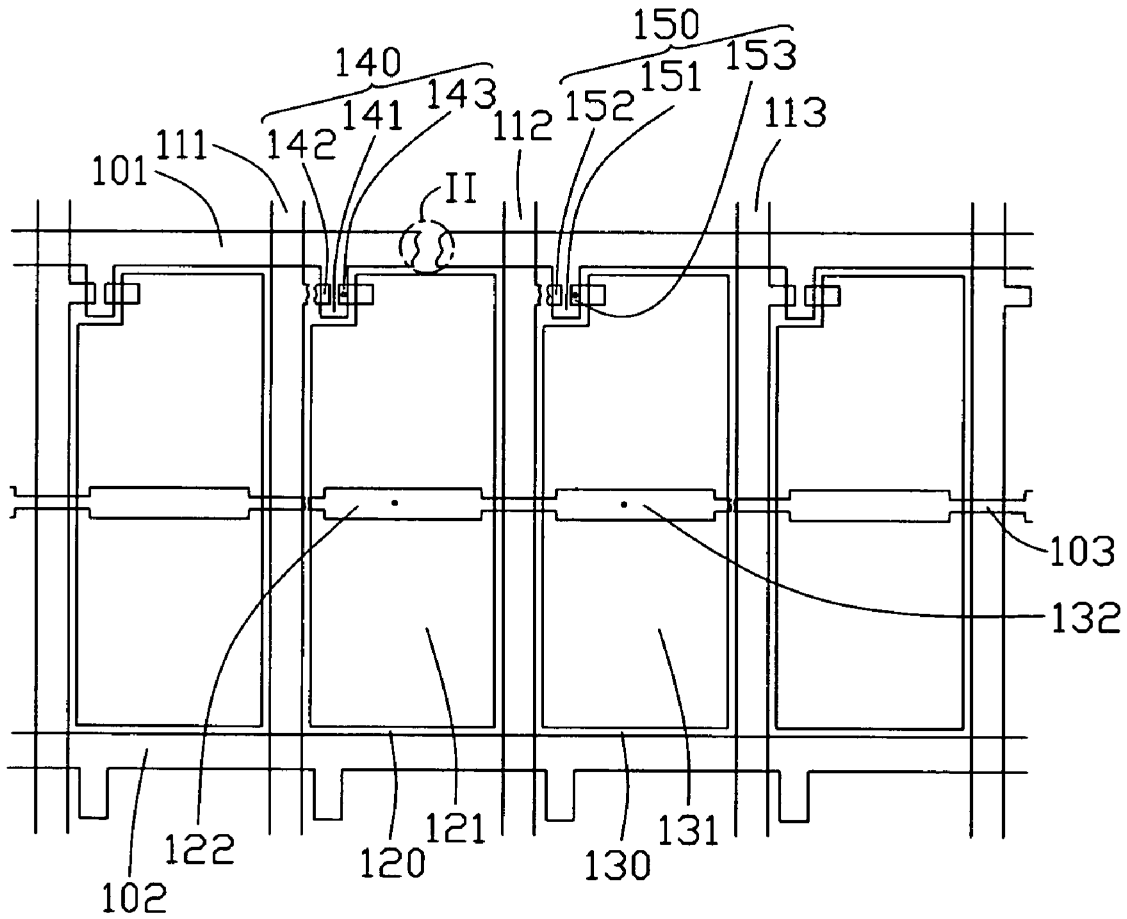
FIG. 2 is similar to FIG. 1, but showing aspects of a method of repairing the disconnected gate line according to a first embodiment of the present invention.

FIG. 2 shows aspects of a method of repairing the disconnected data line 101 according to a first embodiment of the present invention. The method includes the following steps: cutting off the electrical connection between the source electrode 142 of the TFT 140 and the data line 111 at the left side of the defection point "II" by a laser cutting process; cutting off the electrical connection between the source electrode 152 of the TFT 150 and the data line 112 at the right side of the defection point "II" by a laser cutting process; cutting off the electrical connection between a left end of the storage capacitor electrode 122 and other storage capacitor electrodes (not labeled) at the left side of the storage capacitor electrode 122 by a laser cutting process; cutting off the electrical connection between a right end of the storage capacitor electrode 132 and other storage capacitor electrodes (not labeled) at the right side of the storage capacitor electrode 132 by a laser cutting process; welding the gate electrode 141 and the drain electrode 143 of the TFT 140 to electrically short the gate and drain electrodes 141, 143 by a laser melting process; welding the gate electrode 151 and the drain electrode 153 of the TFT 150 to electrically short the gate and drain electrodes 151, 153 by a laser melting process; welding the pixel electrode 121 and the storage capacitor electrode 122 to electrically short the pixel and storage capacitor electrodes 121, 122 by a laser melting process; and welding the pixel electrode 131 and the storage capacitor electrode 132 to electrically short the pixel and storage capacitor electrodes 131, 132 by a laser melting process.

By performing the method described above, the two portions of the gate line 101 at the two opposite sides of the defect point "II" are electrically reconnected through the gate electrode 141 of the TFT 140, the drain electrode 143 of the TFT 140, the pixel electrode 121, the storage capacitor electrode 122, the storage capacitor electrode 132, the pixel electrode 131, the drain electrode 153 of the TFT 150, and gate electrode 151 of the TFT 150 in that order. Thus the disconnected gate line 101 is repaired. Even though the two pixel units 140, 150 are rendered inoperative by the repairing process, the other pixel units connected to the gate line 101 can operate normally. Thus, the dark line displayed on the screen of the TFT-LCD can be eliminated.

Because the above-described method does not need a repairing line to be fabricated at a periphery of the TFT substrate, the cost of repairing the disconnected gate line 101 is lower.

Figure 3:
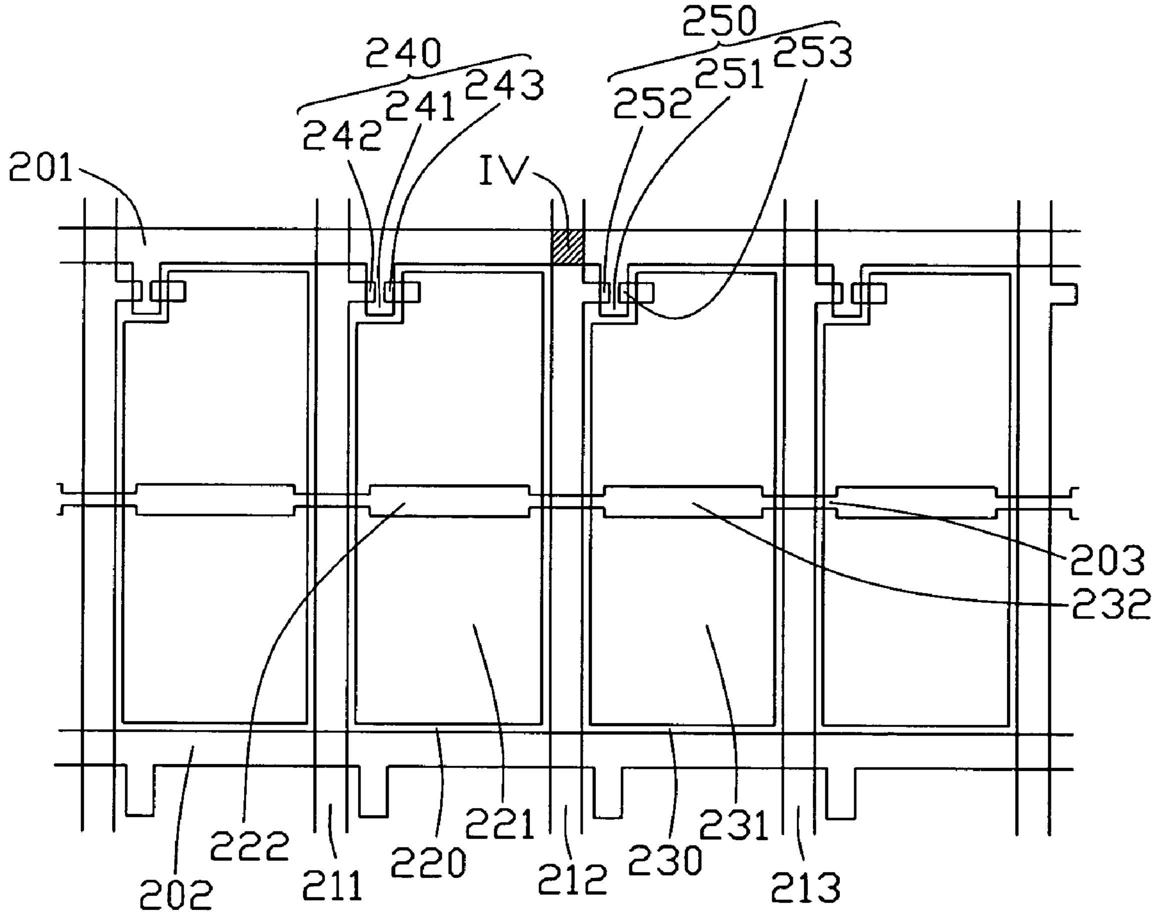
FIG. 3 is a top plan view of part of a thin film transistor substrate of a TFT-LCD having a short point at a crossing between a gate line and a data line.

FIG. 3 is a schematic, top plan view of part of a TFT substrate of another TFT-LCD. The TFT substrate includes a plurality of gate lines 201, 202, and a plurality of data lines 211, 212, 213 crossing the gate lines 201, 202. Two rectangular areas formed by the gate lines 201, 202 and the data lines 211, 212, 213 define two pixel units 220, 230.

The pixel unit 220 includes a pixel electrode 221, a storage capacitor electrode 222 configured under the pixel electrode 221 and parallel to the gate line 201, and a TFT 240 that functions as a switching element. The TFT 240 is provided in the vicinity of a point of intersection of the gate line 201 and the data line 211. A gate electrode 241, a source electrode 242, and a drain electrode 243 of the TFT 240 are connected to the gate line 201, the data line 211, and the pixel electrode 221 respectively.

The pixel unit 230 includes a pixel electrode 231, a storage capacitor electrode 232 configured under the pixel electrode 231 and parallel to the gate line 201, and a TFT 250 that functions as a switching element. The TFT 250 is provided in the vicinity of a point of intersection of the gate line 201 and the data line 212. A gate electrode 251, a source electrode 252, and a drain electrode 253 of the TFT 250 are connected to the gate line 201, the data line 212, and the pixel electrode 231 respectively. The storage capacitor electrodes 222, 232 and other storage capacitor electrodes (not labeled) are arranged in a line and are connected in series to be parts of a conducting line 203.

The gate line 201 has a defect point "IV" at a crossing between the gate line 201 and the data line 212. In the illustrated embodiment, the defect point "IV" is a short. Thus, pixel units connected to the gate line 201 and pixel units connected to the data line 212 cannot work. Therefore, a dark cross is always displayed on the screen of the TFT-LCD.

Figure 4:
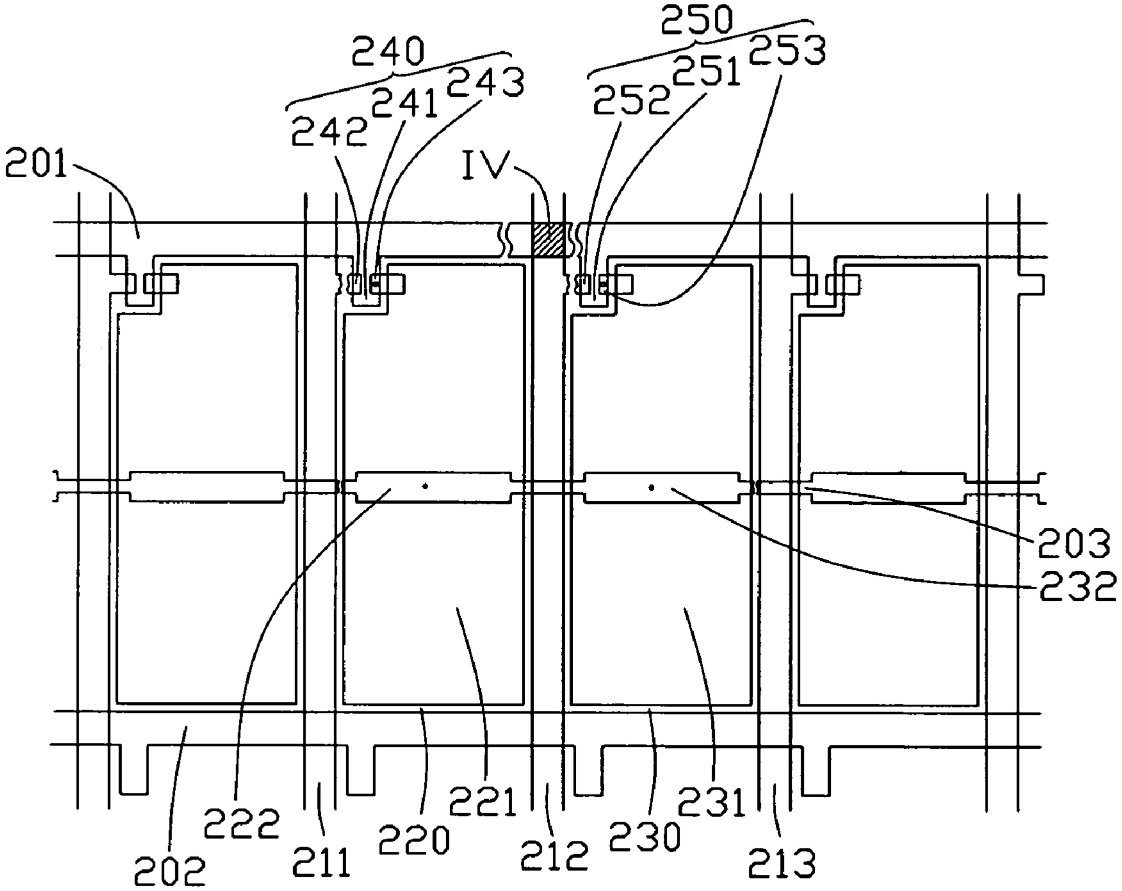
FIG. 4 is similar to FIG. 3, but showing aspects of a method of repairing the short point according to a second embodiment of the present invention.
Figure 5:
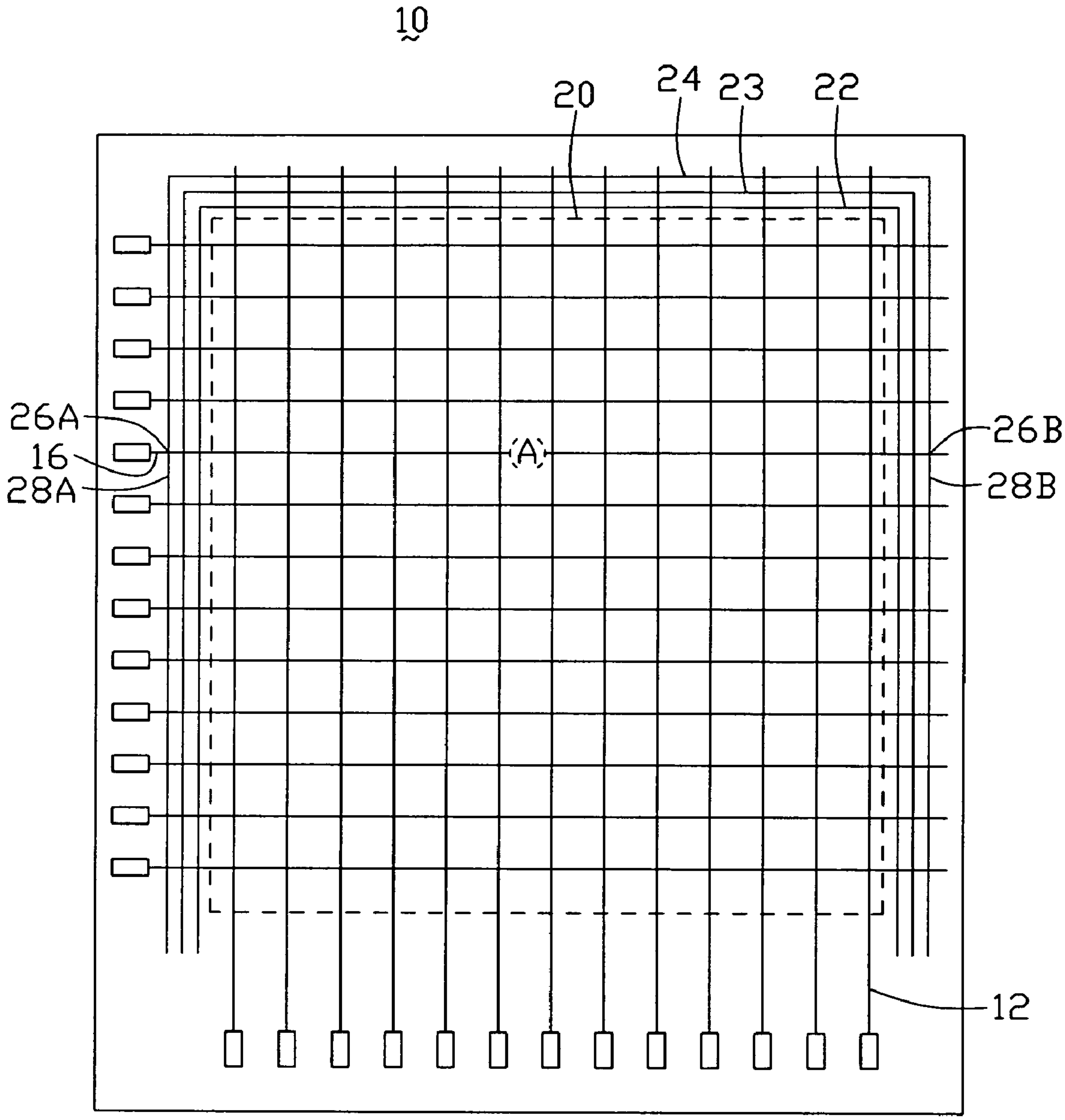
FIG. 5 (RELATED ART)
FIG. 5 is a top plan view of part of a thin film transistor array substrate having a disconnected gate line, showing aspects of a conventional method of repairing the disconnected gate line.

FIG. 4 shows aspects of a method of repairing the short point at the crossing between the gate line 201 and the data line 212 according to a second embodiment of the present invention. The method includes the following steps: cutting off two electrical connections on the gate line 201 at two opposite sides of the data line 212 respectively by a laser cutting process; cutting off the electrical connection between the source electrode 242 of the TFT 240 and the data line 211 at the left side of the defect point "IV" by a laser cutting process; cutting off the electrical connection between the source electrode 252 of the TFT 250 and the data line 212 at the right side of the defect point "IV" by a laser cutting process; cutting off the electrical connection between a left end of the storage capacitor electrode 222 and other storage capacitor electrodes (not labeled) at the left side of the storage capacitor electrode 222 by a laser cutting process; cutting off the electrical connection between a right end of the storage capacitor electrode 232 and other storage capacitor electrodes (not labeled) at the right side of the storage capacitor electrode 232 by a laser cutting process; welding the gate electrode 241 and the drain electrode 243 of the TFT 240 to electrically short the gate and drain electrodes 241, 243 by a laser melting process; welding the gate electrode 251 and the drain electrode 253 of the TFT 250 to electrically short the gate and drain electrodes 251, 253 by a laser melting process; welding the pixel electrode 221 and the storage capacitor electrode 222 to electrically short the pixel and storage capacitor electrodes 221, 222 by a laser melting process; and welding the pixel electrode 231 and the storage capacitor electrode 232 to electrically short the pixel and storage capacitor electrodes 231, 232 by a laser melting process.

By performing the method described above, the two portions of the gate line 201 at the two opposite sides of the defect point “IV” are electrically reconnected through the gate electrode 241 of the TFT 240, the drain electrode 243 of the TFT 240, the pixel electrode 221, the storage capacitor electrode 222, the storage capacitor electrode 232, the pixel electrode 231, the drain electrode 253 of the TFT 250, and gate electrode 251 of the TFT 250 in that order. Thus, the short at the crossing between the gate line 201 and the data line 212 is repaired. Even though the two pixel units 240, 250 are rendered inoperative by the repairing process, the other pixel units connected to the gate line 201 and the data line 212 can operate normally. Thus, the dark cross displayed on the screen of the TFT-LCD can be eliminated.

Because the above-described method does not need a repairing line to be fabricated at a periphery of the TFT substrate, the cost of repairing the shorted gate and data lines 201, 212 is lower. Furthermore, the above-described method can also be used to repair the data line 212 having a disconnected point on the data line.

In an alternative embodiment, a metal film (not shown) can be formed between the pixel electrode 121 and the pixel electrode 131 by a plasma sputtering deposition process. The two pixel electrodes 121, 131 are thus electrically connected to each other via the metal film. Similarly, a metal film (not shown) can be formed between the pixel electrode 221 and the pixel electrode 231 by a plasma sputtering deposition process. The two pixel electrodes 221, 231 are thus electrically connected to each other via the metal film. Each of the metal films can for example be made from metal selected from the group consisting of aluminum, copper, tantalum, and titanium.

It is to be understood, however, that even though numerous characteristics and advantages of the present embodiments have been set out in the foregoing description, together with details of the structures and functions of the embodiments, the disclosure is illustrative only, and changes may be made in detail, including in matters of shape, size, and arrangement of parts within the principles of the invention to the full extent indicated by the broad general meaning of the terms in which the appended claims are expressed.

What is claimed is:

1. A method of repairing gate lines of a thin film transistor (TFT) array substrate of a thin film transistor liquid crystal display (TFT-LCD), wherein the TFT array substrate comprises a plurality of gate lines, a plurality of data lines crossing the gate lines, a plurality of pixel electrodes, and a plurality of TFTs, each TFT comprising a gate electrode, a source electrode, and a drain electrode connecting to a corresponding one of the gate lines, a corresponding one of the data lines, and a corresponding one of the pixel electrodes respectively, and one of the gate lines has a defect point, the method comprising:

cutting off an electrical connection between the gate electrode of one of the TFTs adjacent one side of the defect point and the corresponding data line, and cutting off an electrical connection between the gate electrode of one of the TFTs adjacent an opposite side of the defect point and the corresponding data line;

electrically connecting the gate line having the defect point to each of two pixel electrodes that correspond to the two TFTs at the two opposite sides of the defect point; and electrically connecting the two pixel electrodes.

2. The method as claimed in claim 1, wherein the electrically connecting the gate line having the defect point to each of two pixel electrodes that correspond to the two TFTs at the two opposite sides of the defect point comprises, for each of the two TFTs, welding the gate electrode and the source electrode to each other to electrically short the gate and source electrodes of the TFT.

3. The method as claimed in claim 1, wherein the TFT-LCD further comprises a plurality of storage capacitor electrodes connected in series as parts of a conducting line, each of the storage capacitor electrodes is located under or over a corresponding pixel electrode, the conducting line is substantially parallel to the gate line having the defect point, and electrically connecting the two pixel electrodes comprises:

for each of two of the storage capacitor electrodes that correspond to the two TFTs, cutting off electrical connection between an end of storage capacitor electrode distal from the defect point and an adjacent portion of the conducting line; and welding each of the two pixel electrodes to the corresponding storage capacitor electrode, to electrically short each pixel electrode and the corresponding storage capacitor electrode.

4. The method as claimed in claim 1, wherein any one or more of the cutting off processes is a laser cutting process.

5. The method as claimed in claim 1, wherein any one or more of the electrically connecting processes is a laser melting process.

6. The method as claimed in claim 1, electrically connecting the two pixel electrodes comprises forming a metal film between the two pixel electrodes, and electrically connecting each of the two pixel electrodes to the metal film.

7. The method as claimed in claim 6, wherein the metal film comprises metal selected from the group consisting of aluminum, copper, tantalum, and titanium.

8. The method as claimed in claim 1, wherein the defect point comprises a break in the gate line.

9. The method as claimed in claim 1, wherein the defect point comprises a short at a crossing between the gate line and one of the data lines.

10. The method as claimed in claim 9, further comprising cutting off electrical connection between a portion of the gate line adjacent to one side of the short and an adjacent portion of the gate line distal from the short, and cutting off electrical connection between a portion of the gate line adjacent to an opposite side of the short and an adjacent portion of the gate line distal from the short.

11. A structure of a thin film transistor array substrate of a thin film transistor liquid crystal display comprising:

a plurality of gate lines interwoven with a plurality of data lines to form a plurality of units surrounded by said intersecting gate lines and data lines;

each of said units defining neighboring pixel electrode and storage capacitor electrode, and a TFT;

a positioned of one of said gate lines being broken at a position between two neighboring data lines, electrical link between a source electrode of the TET of the corresponding unit adjacent said broken position and the date line aside said TFT and by one side of said broken place being disconnected, electrical link between a source electrode of the TFT of a first neighboring unit, which shares with said corresponding unit the same data line located by the other side of the broken position, and said same data line being disconnected, electrical link between the storage capacitor electrode of the corresponding unit and that of second neighboring unit, which is opposite to the neighboring unit, being disconnected;

electrical link between the storage capacitor electrode of the neighboring unit and that of a third neighboring unit, which is opposite to the corresponding unit, being disconnected.

12. The structure as claimed in claim 11, wherein a gate electrode and a drain electrode of the corresponding unit being electrically shorted, another gate electrode and another drain electrode of the first neighboring unit being electrically shorted, the storage capacitor electrode and the pixel electrode of the corresponding unit being electrically shorted, and the storage capacitor electrode and the pixel electrode of the first neighboring unit being electrically connected.

* * * * *